No. 12,373. REISSUED JULY 18, 1905.
O. G. KIPP.
LUBRICATOR.
APPLICATION FILED AUG. 24, 1903.
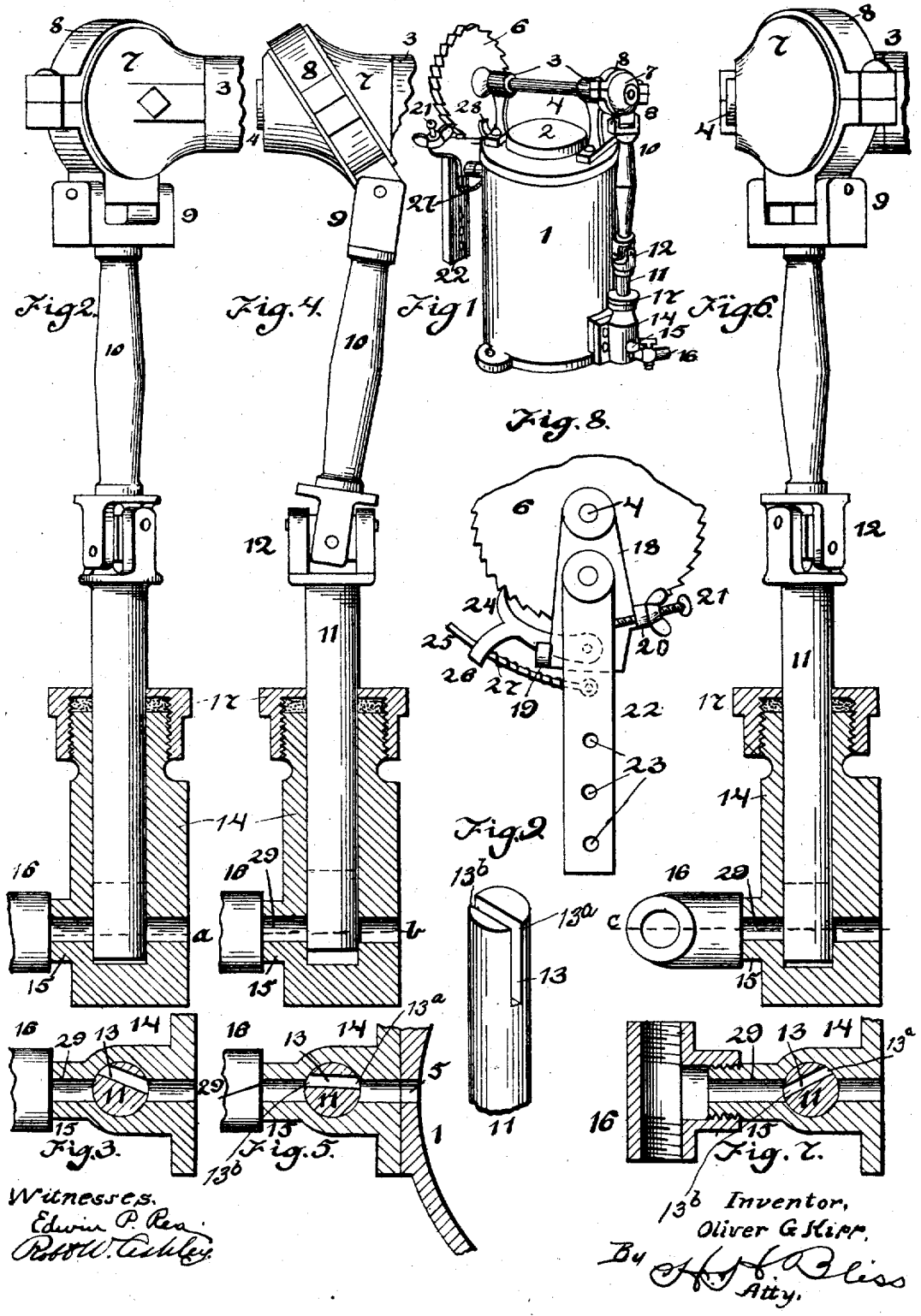
ANDREW B. GRAHAM CO. PHOTO-LITHOGRAPHERS, WASHINGTON, D. C.

No. 12,373.

Reissued July 18, 1905.

UNITED STATES PATENT OFFICE.

OLIVER G. KIPP, OF MADISON, WISCONSIN, ASSIGNOR TO THE MASON-KIPP MANUFACTURING COMPANY, OF MADISON, WISCONSIN, A CORPORATION OF WISCONSIN.

LUBRICATOR.

SPECIFICATION forming part of Reissued Letters Patent No. 12,373, dated July 18, 1905.

Original No. 699,191, dated May 6, 1902. Application for reissue filed August 24, 1903. Serial No. 170,612.

*To all whom it may concern:*

Be it known that I, OLIVER G. KIPP, a citizen of the United States, residing at Madison, in the county of Dane and State of Wisconsin, have invented certain new and useful Improvements in Lubricators, of which the following is a specification, reference being had therein to the accompanying drawings.

This invention relates to improvements in lubricators of the sort in which a positive feed is secured and the quantity of oil delivered is under complete control.

In the accompanying drawings, Figure 1 is an isometrical representation of my improved lubricator. Fig. 2 is a partial side elevation, the cylinder being in vertical section and the slot in the piston in communication with the oil-reservoir. Fig. 3 is a horizontal section on dotted line *a*, Fig. 2. Fig. 4 is a partial side elevation, the cylinder being in vertical section and the piston at the upper end of its stroke. Fig. 5 is a horizontal section on dotted line *b*, Fig. 4. Fig. 6 is a partial side elevation, the cylinder being in vertical section and the piston at the lower end of its stroke and in communication with the discharge-opening. Fig. 7 is a horizontal section on dotted line *c*, Fig. 6. Fig. 8 is an end elevation of the actuating means. Fig. 9 is an isometrical representation of the piston.

The oil-reservoir 1 has an opening in its top closed by a cover 2. From the upper end of this reservoir extend two brackets 3, which support a shaft 4. In the lower end of the reservoir is located an oil-outlet 5. To one end of the shaft 4 is secured a ratchet-wheel 6, and to the other end of the shaft is secured an eccentric 7, supporting a strap 8. The eccentric is located diagonally to the lengthwise direction of the shaft.

To the strap 8 is pivoted a yoke 9. The yoke is secured to a rod 10, having a connection with a piston 11 by a universal joint 12. The piston 11 has a lengthwise slot 13, located to one side of the center of the piston.

A cylinder 14 is secured to one side of the oil-reservoir and has a threaded extension 15, to which is connected the piping 16, leading to the parts to which oil is to be delivered. A stuffing-box 17 is located at the upper end of the cylinder.

Upon the shaft 4 is pivoted an arm 18, from which extend two projections 19 and 20. A screw 21 has a connection with the projection 20.

To the arm 18 is pivoted a lever 22, which is located between the projections 19 and 20 of the arm 18. This lever has a series of holes 23. A dog 24 has a pivotal connection with the arm 18 near its free end and engages the teeth of the ratchet-wheel 6. A rod 25 has a pivotal connection with the lever 22 and passes through an opening in an extension 26 of the dog 24. A coiled spring 27 surrounds the rod 25, one end pressing against the extension 26 and the other end against the eye of the rod at its point of connection with the lever. A flat spring 28 is supported by the oil-reservoir and bears against the inner face of the ratchet-wheel.

With the parts in the position shown at Figs. 2 and 3 the piston will be down to its fullest extent, and the opening 13 in the piston will communicate with the opening leading from the cylinder into the oil-reservoir. If movement be imparted to the lever 22, it will move the arm 18, and through the dog 24 an intermittent rotary movement will be imparted to the ratchet-wheel 6 and through the shaft to the eccentric. The intermittent rotary movement imparted to the eccentric will be imparted to the piston and in moving from the position shown at Fig. 2 to the position shown at Fig. 4 will raise the piston and draw in a charge of oil from the oil-reservoir, at the same time gradually turning the piston until the opening 13 is parallel to the axis of the openings 5 and 29. This completes a quarter-revolution of the eccentric. Another quarter-revolution of the eccentric will turn the piston as shown at Figs. 6 and 7—that is, the piston will have partially rotated—so that the opening 13 will communicate with the oil-discharge opening 29 and will have moved down to its fullest extent, thereby forcing the oil out. The remaining one-half revolution of the eccentric will partially rotate the piston from the position shown at Figs. 6 and 7 into the position shown at Figs. 2 and 3, which will bring the opening 13 into communication with the opening leading from the oil-reservoir. When the piston is in the position shown at Fig. 3 and its opening 13 in communication with the oil-opening leading from the oil-reservoir, it acts as a valve and cuts off communication with the outlet-opening 29, and when the piston is in communication with the outlet-opening 29 communication is cut off with the opening leading to the oil-reservoir.

The eccentric movement, in combination with the movement imparted by the eccentric owing to it being located at an oblique angle to the shaft, will reciprocate the piston and at the same time give the oscillatory movement during one half-revolution of the shaft and will give it a return oscillatory movement without reciprocation during the other half-revolution.

The lever 22 is held against the set-screw 21 by the action of the coiled spring 27, and the dog 24 will not be moved until the lever comes in contact with the projection 19. The spring 27 serves the double purpose of holding the dog in connection with the teeth of the ratchet-wheel and the arm yieldingly against the set-screw.

The flat spring 28 bears against the ratchet-wheel and holds it until the dog engages another notch.

The present mechanism is especially designed and is well adapted for the feeding of heavy or approximately viscid lubricant material and for accomplishing such feeding continuously and with substantial uniformity at all times. The lubricant material is such that it offers great resistance to its flow. It cannot be successfully fed along a duct if it is intermittently forced first in one direction and then in the opposite one, nor can it be successfully advanced along a duct if opening and closing valves are present supplemental to the piston-cylinder. For all ordinary purposes the diameter of the piston and of the cylinder-bore are not more than one-half inch or thereabout and cannot be larger, and it is practically impossible to combine with the piston and cylinder of such dimensions supplemental valves which will be reliable in permitting the proper flow in and out of the approximately viscid lubricant.

The oil-passage or slot-like opening 13 in the piston is so related to the cylinder inlet and outlet ports as to provide at its edges portways $13^a$ and $13^b$, which respectively register with the cylinder inlet and outlet ports, and the oil is intermittently permitted to pass directly from the one to the other without necessitating the reversal of its movement at any point. The path of vertical reciprocation of the piston is short, being not over two to three sixteenths of an inch, and the device is illustrated in Figs. 2, 3, 4, &c., of the drawings as of substantially the full size as used in ordinary engine-lubricators. The desire and intent are to reduce the vertical reciprocation to the minimum degree, providing for merely enough movement to insure a sufficient pressure as the piston descends upon the oil passing through the body of the piston. To allow for its passage-way through the piston, use is made of the two aforesaid vertical portways and also a portway at the bottom communicating with the chamber in the bottom of the cylinder.

I am aware that it has been heretofore proposed to construct power-generating engines with cylinders and longitudinally and axially reciprocating pistons having steam-passages which permit the steam to pass first in one direction and then in the opposite direction through the piston, and I do not claim such earlier mechanisms as of my invention.

I claim as my invention—

1. In a lubricator, the combination of an oil-reservoir, a cylinder supported by the reservoir, the lower end of the cylinder provided with an opening extending radially forming a communication between the cylinder and reservoir and a discharge-opening, a piston located within the cylinder and provided with a lengthwise slot which is located to one side of the center of the piston, a shaft, an eccentric supported by the shaft and located diagonally to the lengthwise direction of the shaft, and a connection between the eccentric and piston.

2. In a lubricator, the combination of an oil-reservoir, a cylinder, a piston for the cylinder, a shaft, a connection between the shaft and piston, a ratchet-wheel secured to the shaft, an arm supported by the shaft, a lever supported by the arm, a dog supported by the arm, and a spring connection between the dog and lever.

3. In a lubricator, a pump-like device having a cylinder with an oil-inlet port and an oil-outlet port, and a longitudinally reciprocating and oscillating piston in the chamber in the said cylinder having a longitudinal slot therethrough adapted to intermittently communicate with the cylinder inlet and outlet ports to feed the oil transversely through said piston, substantially as set forth.

4. In a lubricator, a pump-like device having a cylinder with an oil-inlet port and an oil-outlet port in combination with a longitudinally reciprocating and oscillating piston in the cylinder-chamber, and the oil-passage extending longitudinal of and transversely through said piston and having an inlet-portway and an outlet-portway, respectively, communicating with the cylinder-ports and through which oil can pass transversely through said cylinder, substantially as set forth.

5. In a lubricator, a pump-like device having in combination, a cylinder with an oil-inlet port and an oil-outlet port and a chamber extending below said ports, and a longitudinally reciprocating and oscillating piston having an oil-passage with three independent portways, one communicating with the cylinder-chamber and the other two intermittently communicating respectively with the cylinder inlet and outlet ports, substantially as set forth.

6. In a lubricator, the combination with the cylinder having an inlet-port and an oppositely-arranged outlet-port, of the longitudinally reciprocating and oscillating piston having an oil-passage formed directly through it and adapted to intermittently communicate with the said cylinder-ports and to convey oil from one to the other transversely through the cylinder, substantially as set forth.

7. In a lubricator, the combination with an oil-reservoir, of the cylinder having an intake oil-duct communicating with the oil-reservoir and an oppositely-arranged oil-outlet duct, a longitudinally reciprocating and oscillating piston fitted in the said cylinder and provided with an oil-passage having an inlet-portway adapted to communicate with the oil-inlet duct of the cylinder, and a supplemental outlet-portway adapted to communicate with the aforesaid oil-outlet duct of the cylinder, the said oil-passage in the piston being adapted to permit the oil to flow in one direction across the cylinder, substantially as set forth.

8. In a lubricator, the combination of an oil-reservoir, a cylinder having an oil-inlet port communicating with the oil-reservoir and an oppositely-arranged oil-outlet port and a piston having a slot-like oil-passage opening at one end into said cylinder and extending across the body of said piston, said passage having an oil-inlet port adapted to register with the cylinder-inlet port, and an outlet-port adapted to register with the cylinder outlet-port, and means for reciprocating and oscillating said piston, substantially as set forth.

In testimony that I claim the above I hereunto set my hand in the presence of two witnesses.

OLIVER G. KIPP.

Witnesses:
CHARLES H. PUTNAM,
A. A. STELTING.